US011513931B2

(12) United States Patent
Liu et al.

(10) Patent No.: US 11,513,931 B2
(45) Date of Patent: *Nov. 29, 2022

(54) ANOMALY AWARE LOG RETRIEVAL FROM DISK ARRAY ENCLOSURES (DAES)

(71) Applicant: EMC IP Holding Company LLC, Hopkinton, MA (US)

(72) Inventors: Bing Liu, Tianjin (CN); Rahul Vishwakarma, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/485,128

(22) Filed: Sep. 24, 2021

(65) Prior Publication Data

US 2022/0138072 A1 May 5, 2022

Related U.S. Application Data (63) Continuation of application No. 17/084,221, filed on Oct. 29, 2020, now Pat. No. 11,200,132.

(51) Int. Cl.
*G06F 11/00* (2006.01)
*G06F 11/30* (2006.01)
(Continued)

(52) U.S. Cl.
CPC ........ *G06F 11/3034* (2013.01); *G06F 11/079* (2013.01); *G06F 11/0727* (2013.01);
(Continued)

(58) Field of Classification Search
CPC ............. G06F 11/0727; G06F 11/0751; G06F 11/0778; G06F 11/0787; G06F 11/079;
(Continued)

(56) References Cited

U.S. PATENT DOCUMENTS 7,912,995 B1* 3/2011 Long ................... G06F 13/385
710/17
9,311,503 B2* 4/2016 Lim ........................ H04L 63/20
(Continued)

OTHER PUBLICATIONS

Kumar, Rohit, Senthilkumar Vijayakumar, and Syed Azar Ahamed. "A pragmatic approach to predict hardware failures in storage systems using MPP database and big data technologies." In 2014 IEEE International Advance Computing Conference (IACC), pp. 779-788. IEEE, 2014. (Year: 2014).*

*Primary Examiner* — Anthony J Amoroso
(74) *Attorney, Agent, or Firm* — Staniford Tomita LLP (57) ABSTRACT An anomaly with a disk array enclosure (DAE) of a set of DAEs connected to a host server is detected. Each DAE is chained to another DAE by first and second chains and includes a serial attached SCSI (SAS) expander and a peer SAS expander. The SAS expander in a DAE forms part of the first chain. The peer SAS expander in the DAE forms part of the second chain. Upon detection, DAE log collection is triggered to obtain logs for storage in a repository, separate from the DAEs. The logs are tagged with an anomaly class of a set of anomaly classes. For each anomaly class, a number of logs stored in the repository is limited to a threshold number.

18 Claims, 7 Drawing Sheets (51) Int. Cl.
*G06F 13/42* (2006.01)
*G06F 11/07* (2006.01)

(52) U.S. Cl.
CPC ...... *G06F 11/0751* (2013.01); *G06F 11/0778* (2013.01); *G06F 11/0787* (2013.01); *G06F 11/3048* (2013.01); *G06F 13/4221* (2013.01); *G06F 11/3055* (2013.01); *G06F 2201/81* (2013.01)

(58) Field of Classification Search
CPC .. G06F 11/30; G06F 11/3003; G06F 11/3006; G06F 11/3034; G06F 11/3048; G06F 11/3051; G06F 11/3055; G06F 13/4221; G06F 2201/81
See application file for complete search history.

(56) References Cited

U.S. PATENT DOCUMENTS

| | | | |
|---|---|---|---|
| 2007/0294572 A1* | 12/2007 | Kalwitz | G06F 11/076 710/104 |
| 2008/0010530 A1* | 1/2008 | Davies | H04L 1/24 714/31 |
| 2014/0032960 A1* | 1/2014 | Konishi | G06F 11/2025 714/6.3 |
| 2014/0325285 A1* | 10/2014 | Wu | G06F 11/079 714/43 |
| 2017/0046152 A1* | 2/2017 | Shih | G06F 11/0727 |
| 2020/0142850 A1* | 5/2020 | Das | G06F 3/0635 |

* cited by examiner

FIG. 8 though the figures depict various examples, the one or more embodiments and imple-
ANOMALY AWARE LOG RETRIEVAL FROM DISK ARRAY ENCLOSURES (DAES)

CROSS-REFERENCE TO RELATED APPLICATIONS

This patent application is a continuation of U.S. patent application Ser. No. 17/084,221, filed Oct. 29, 2020, which is incorporated by reference along with all other references cited in this application.

TECHNICAL FIELD

The present invention relates generally to the field of information management, and, more particularly, to collecting logs from storage devices.

BACKGROUND

Disk array enclosures (DAEs) allow an organization to expand their storage capacity. A DAE is a type of storage device having a set of disks, controller, power supply, and other components. The disks can be arranged and presented as one or more logical units. The organization's storage architecture may thus include a server connected to a set of DAEs. The DAEs generate logs. The logs record various events including error messages and codes that can be used to help troubleshoot problems associated with the DAEs. These log files are stored at the DAEs in a buffer. When the buffer is full, the existing logs are overwritten with new logs. The size of the buffer is often very small while the size of the logs is often very large. Thus, an administrator is afforded only a very small window of time within which to obtain the logs before they are overwritten.

Attempting to troubleshoot a problem with the storage system when logs are not available for review can be extremely difficult. There is a need for improved systems and techniques for log collection.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. The variable N and other similar index variables are assumed to be arbitrary positive integers greater than or equal to two.

Figure 1:
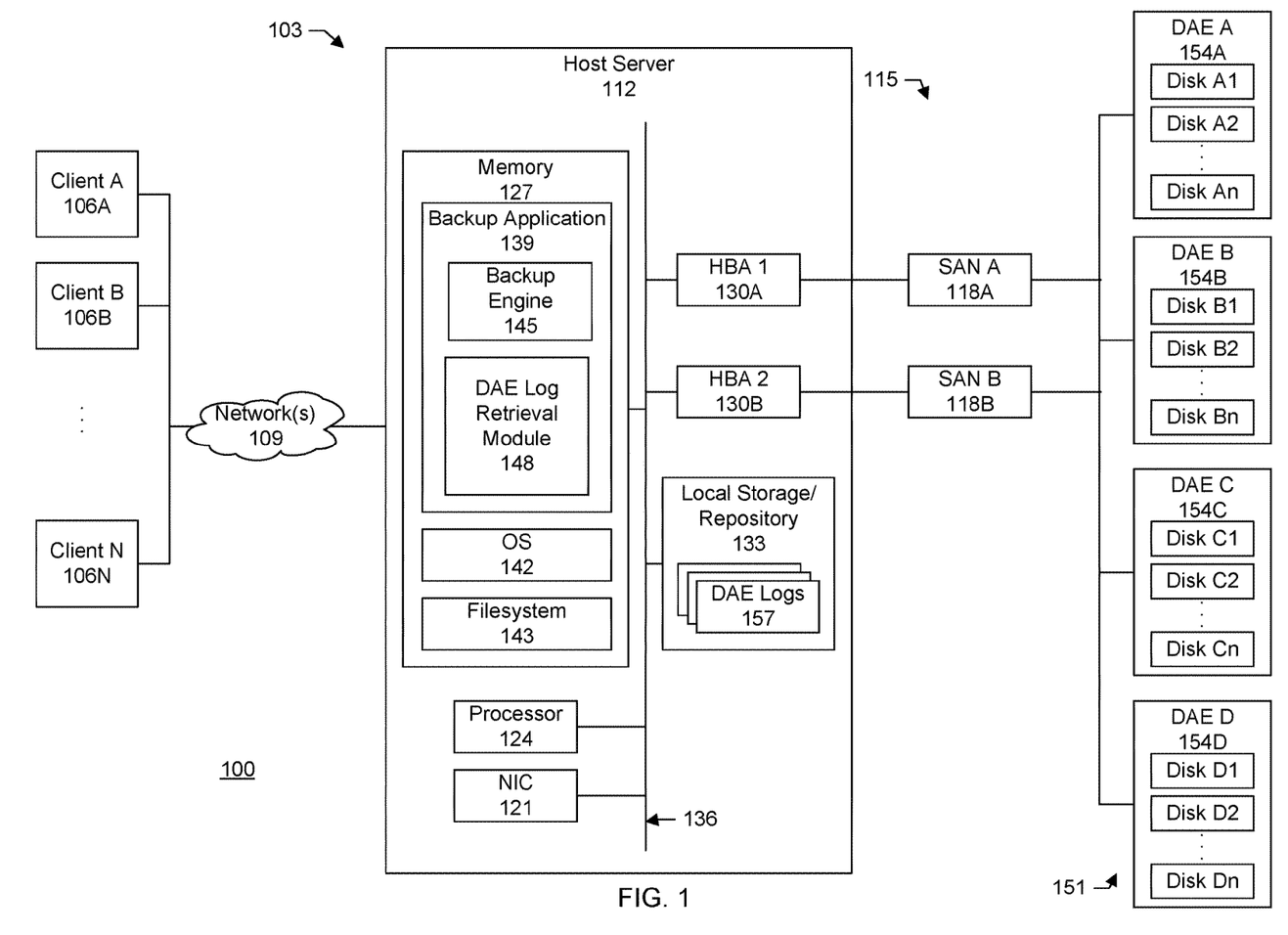
FIG. 1 shows a block diagram of an information handling system for anomaly aware log retrieval in accordance with one or more embodiments.

FIG. 1 shows a block diagram of a system 100 for anomaly aware retrieval and collection of logs from a set of disk array enclosures (DAEs). In a specific embodiment, a method of anomaly aware log collection detects IO performance degradation, a device suddenly becoming offline and other abnormal issues associated with the storage topology. A smart DAE log maintenance algorithm efficiently stores logs based on a DAE problem classification such as "slow IO", "sudden device offline" and "storage topology."

The system includes an information handling system 103. In a specific embodiment, the information handling system is a data protection or backup system. A network 109 connects any number of clients 106A-N to the backup system.

A client is any host having or generating data that is to be protected by the backup system. The data may include unstructured data including files (e.g., word processing documents) or email data, structured data including databases, or both. A client can be any type of computing device including physical and virtual computing devices. Some examples of clients include desktop computers, laptops, tablet devices, smartphones, servers, virtual machines, containers, and so forth. Backup data may include, for example, databases, emails, user-generated files, and other data.

In a specific embodiment, the backup system is a deduplication-based backup system. The system provides backup, restore, retrieval, and archive operations. An example of a deduplication-based backup system is Data Domain as provided by Dell EMC of Hopkinton, Mass. While some embodiments are described in conjunction with a backup system referred to as Data Domain, it should be appreciated that aspects and principles of the systems and techniques described herein can be applied to other backup or data protection systems provided by other vendors. It should be appreciated that the blocks, components, and modules shown in FIG. 1 and elsewhere may be functional and there can be many different hardware configurations, software configurations, or both to implement the functions described.

The system includes a host server 112 connected to a backup storage system 115. The server may be referred to as a backup server. The connection may be via a local area network (LAN) or one or more storage area networks (SANs) 118A,B as shown in the example of FIG. 1.

The host server includes components such as a network interface controller (NIC) 121, processor 124, memory 127, one or more host bus adaptors (HBAs) 130A,B, local storage 133 (e.g., hard drive or solid state drive (SSD)), and other components that may be interconnected via a bus 136 or other interconnection architecture.

In an embodiment, the memory includes a backup application 139, operating system 142, and filesystem 143. The backup application includes a backup engine 145 and an anomaly aware DAE log retrieval module 148. The operating system manages the server hardware, software resources, and provides common services for the applications and other programs.

The backup engine is responsible for backing up data from the clients to the backup storage system. Backups may be conducted according to a backup schedule. The filesystem organizes data stored across the storage devices and presents the data in a logical format.

In a specific embodiment, the filesystem is a deduplicated filesystem. In a deduplication-based system, data such as files to be backed up are divided into a set of segments. The segments are hashed to generate a set of fingerprints. These fingerprints uniquely identify the segments. The backup system maintains metadata separate from the actual client data being backed up. The metadata includes a collection of fingerprints corresponding to data segments that already exist on the backup system. If the fingerprint of a data segment from a file to be backed up does not match an existing fingerprint, the data segment is written to the physical disk storage of the backup system and the fingerprint is added to the collection of existing fingerprints. If, however, the fingerprint matches an existing fingerprint, the data segment is determined to be a duplicate and is not written to the backup storage system. Instead, a reference is generated that points to the already existing data segment on backup storage that corresponds to the fingerprint. The reference is stored as metadata by the backup system so that the file can be reconstructed or reassembled as part of a restore operation.

Local storage may include hard drives, solid state drives (SSDs), or other persistent storage media. The local storage of the server is separate from backup storage system 115. Backup storage system 115 may be referred to as remote storage.

In the example shown in FIG. 1, the backup storage system includes SANs 118A,B. The SANs provide access to a set of shared storage devices 151. In particular, the host bus adaptors of the server connect the server to the storage devices of the backup storage system. The host bus adaptors provide input/output (I/O) processing and physical connectivity between the server and storage devices for transferring data between the host server and storage devices.

In a specific embodiment, the storage devices include a set of disk array enclosures (DAEs). The DAEs are arranged to form a serial attached SCSI (SAS) domain. SAS is a point-to-point serial protocol that moves data to and from computer-storage devices such as hard drives and tape drives. There can be any number of DAEs. The example shown in FIG. 1 includes first, second, third, and fourth DAEs 154A-D, respectively. A DAE houses multiple individual storage disk drives such as hard drives (HDDs) or solid state drives (SSDs) in a single enclosure. A DAE may include a controller, expander, cache memory (e.g., volatile random-access memory, non-volatile flash memory, or both), power supply, cooling unit, firmware, connectors, ports, and storage virtualization.

In a specific embodiment, the DAEs are configured into Redundant Array of Independent Disks (RAID) groups. RAID is a data storage virtualization technology that combines multiple physical disk drive components into one or more logical units for the purposes of data redundancy, performance improvement, or both. A RAID group may include multiple disks from a single DAE or multiple disks from multiple DAEs organized into a single logical unit. Data may be distributed or "striped" across the disks of a RAID group.

A customer of the backup system can increase the data storage capacity of the backup system by purchasing additional DAEs. A DAE may be provided by a third party vendor, i.e., a vendor different from a vendor of the backup host server. The host server, via the HBAs, allow for connecting to multiple interconnected DAEs.

Over time problems may arise in the storage system. The problems may include slow performance, drive or DAE accessibility, disk errors, invalid reads, invalid writes, or other problems. The DAEs generate log files. These logs record various events, status, services, configuration, changes, timestamps, errors, and other information that can help an administrator diagnose and troubleshoot issues before a major disaster such as a loss of data occurs. A DAE may include a ring buffer within which the logs are stored. A ring buffer is a data structure that uses a single, fixed-size buffer as if it were connected end-to-end. When a ring buffer is full and a subsequent write is performed, the oldest data in the ring buffer is overwritten with the new data.

The size of the buffer is limited and log files can be extremely large. Thus, the logs may be stored in the buffer for only a short period of time before they are overwritten by new logs. An administrator may not have an opportunity to retrieve and analyze a set of logs from a problematic DAE before they are overwritten. The lack of a log can make it very difficult to pinpoint the root cause of a problem. For example, the problem may be with the cabling, connector, host bus adaptor, SAS expander, disk, configuration, firmware, power supply, and so forth. Attempting to identify the root cause without being able to review the log, however, can be very frustrating.

In a specific embodiment, the anomaly aware DAE log retrieval module is responsible for detecting an anomaly associated with the storage system and upon detecting the anomaly, triggering automatic log collection to retrieve logs from the DAEs. The anomaly may be associated with a topology, or one or more performance metrics of the storage system.

The DAE log retrieval module stores retrieved DAE log files 157 in the local storage of the server, separate from the DAEs. The DAE logs are classified or organized by anomaly class. The DAE logs may be tagged with an anomaly class. The log retrieval module further limits, by anomaly class, the number of logs that are maintained in local storage. For example, the local storage may include a first set of existing DAE logs tagged with a first anomaly class. A newly retrieved DAE log tagged with the first anomaly class may not be stored in the local storage (or may replace an existing log in the first set of existing DAE logs) if a number of DAE logs in the first set of existing DAE logs has already reached a threshold number. This helps to ensure that there is space in local storage should any other new logs arrive that are tagged with an anomaly class different from the first anomaly class—while also ensuring that logs associated with the first anomaly class are retained.

When the opportunity arises, the administrator can access and review the logs stored in the local storage even if original copies of the logs have been overwritten in the ring buffers maintained at the DAEs and thus no longer exist at the DAEs.

Figure 2:
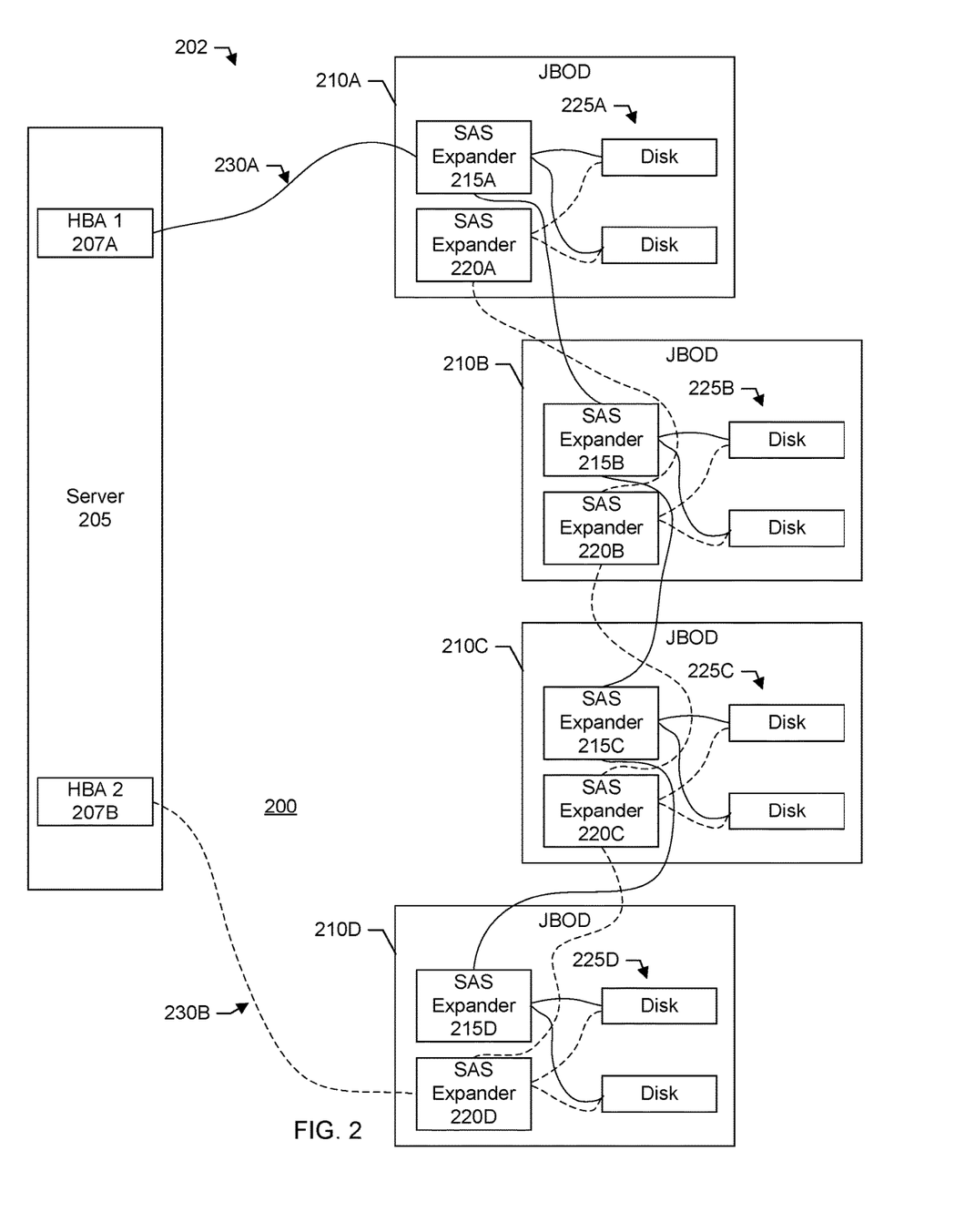
FIG. 2 shows a block diagram of a SAS domain in accordance with one or more embodiments.

FIG. 2 shows a block diagram illustrating a SAS domain 200 in further detail. The example shown in FIG. 2 includes a host server 205 and a set of disk array enclosures 210A-D. In a specific embodiment, there are multiple disk enclosures deployed in a data protection system as backend storage devices. They are connected to each other by Serial-Attached SCSI (SAS) cables and then attached to the host HBAs, which constitute the SAS domain topology. In an embodiment, the disk array enclosures are attached in a SAS multipathing configuration. Multipathing provides high availability by allowing data to use multiple paths to the arrays from the host bus adaptors on the same server or on different servers.

In a specific embodiment, the host server includes first and second host bus adaptors 207A,B. As shown in the example of FIG. 2, each disk array enclosure includes a serial attached SCSI (SAS) expander (215A-D), a peer SAS expander (220A-D), and a collection of disks (e.g., just a bunch of disks (JBOD) 225A-D) connecting to SAS expanders in respective DAEs. In a specific embodiment, the disks are configured into a set of RAID groups.

A SAS expander is a physical device that may have components such as a controller chip, memory storing firmware, and buffer (e.g., ring buffer) to which logs are written. A SAS expander includes ports to connect devices and provides switching capabilities. A SAS expander may expose a programmatic interface (e.g., application programming interface (API)) through which commands may be received. DAEs may be connected to each other via their SAS expanders. A SAS domain is a group of SAS expander devices and end devices that are physically connected. End devices refer to devices that are at ends relative to the SAS expander. For example, the host bus adaptor may be referred to as an initiator or SCSI initiator. The host bus adaptor issues SCSI commands to other SCSI target storage devices (e.g., disks or disk arrays). The target storage, upon receiving the SCSI commands, provides the requested 10 data transfers accordingly.

The disks in each DAE are routed to different host bus adapter ports via one or more SAS expanders, such that there are two paths to the server. More specifically, each DAE is chained to another DAE via first and second chains 230A,B, respectively. First chain 230A is shown using a solid line. Second chain 230B is shown using a broken line. The chains include cabling to interconnect the DAEs and the server. Each SAS expander in the DAEs form part of the first chain; while each peer SAS expander in the DAEs form part of the second chain. The chaining arrangement facilitates redundancy and reliability.

For example, starting from the first HBA, first SAS expander 215A is connected to the first HBA and forms part of the first chain. Specifically, the first chain includes first SAS expander 215A in first DAE 210A, which in turn is chained to second SAS expander 215B in second DAE 210B, which in turn is chained to third SAS expander 215C in third DAE 210C, which in turn is chained to fourth SAS expander 215D in fourth DAE 210D.

Similarly, starting from the second HBA, fourth peer SAS expander 220D is connected to the second HBA and forms part of the second chain. Specifically, the second chain includes fourth peer SAS expander 220D in fourth DAE 210D, which in turn is chained to third peer SAS expander 220C in third DAE 210C, which in turn is chained to second peer SAS expander 220B in second DAE 210B, which in turn is chained to first peer SAS expander 220A in first DAE 210A.

A DAE, or more specifically a SAS expander in the DAE, can be described relative to other SAS expanders in other DAEs along the same chain. For example, first SAS expander 215A has second, third, and fourth SAS expanders 215B-D as downstream neighbors. In other words, the first SAS expander is upstream from the second SAS expander. The first and second SAS expanders are upstream from the third SAS expander. The first, second, and third SAS expanders are upstream from the fourth SAS expander.

Similarly, fourth peer SAS expander 220D has third, second, and first peer SAS expanders 220C-A as downstream neighbors. In other words, the fourth peer SAS expander is upstream from the third peer SAS expander. The fourth and third peer SAS expanders are upstream from the second peer SAS expander. The fourth, third, and second peer SAS expanders are upstream from the first peer SAS expander.

As discussed, there can sometimes be problems related to a SAS domain. Such problems may include a disk suddenly going offline, an unsuccessful disk scan, device flappy and slow IO response. It is helpful to investigate the issue from both host side and disk enclosure side's logs. A disk enclosure log can include especially useful information such as the expander/SAS device's SCSI diagnostic status, latest error counters, and event trace logs.

Obtaining logs from the disk enclosure side, however, is often problematic. The difficulty in obtaining logs from the disk enclosure side may be due to one or more of the following reasons:

1) DAE (disk array enclosure) ring buffer size is limited from about 1 kilobytes (KB) to about 20+KB. Old logs are easily overwritten when the buffer is full.

2) Lack of a sufficient DAE log collection trigger mechanism. Manually running commands by a support engineer to collect logs is time-consuming and laborious. Periodically running log collection can still miss collecting relevant logs because there is still a chance that relevant logs will be overwritten between collection runs. It is desirable that logs be collected timely and contemporaneously with anomaly detection.

It is desirable to provide a smart DAE log collection mechanism that facilitates clearly defining when to trigger the DAE log collection; and smartly decides how to maintain useful DAE logs when numerous log files are dumped in the system.

In a specific embodiment, systems and techniques are provided for effective retrieval of DAE logs. After the retrieval, the logs can be shared with the DAE vendor team for further analysis since some private trace information can only be parsed from their side.

Figure 3:
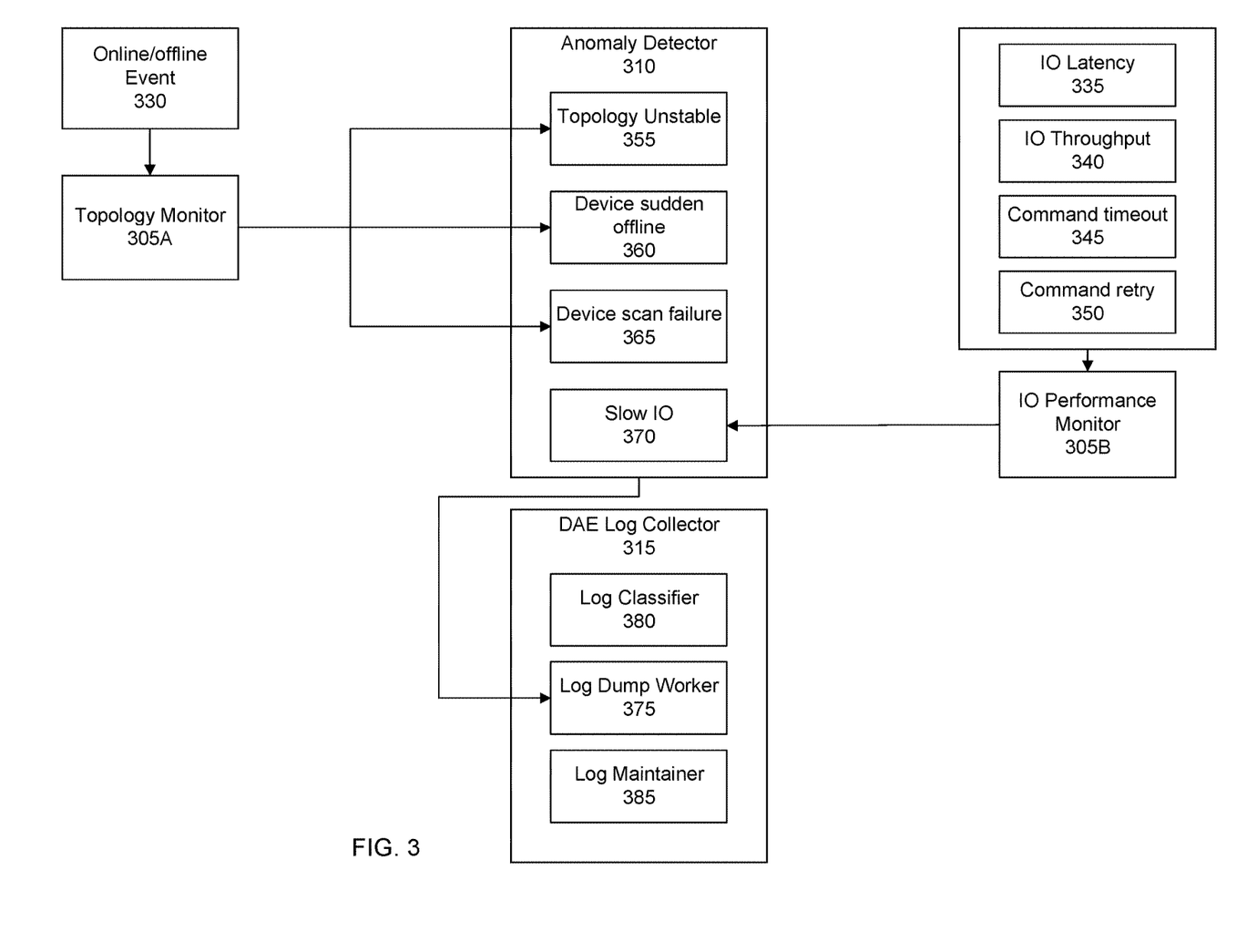
FIG. 3 shows a block diagram of components for an anomaly aware log retrieval module in accordance with one or more embodiments.

FIG. 3 shows a block diagram of a framework of the anomaly aware DAE log retrieval module. In a specific embodiment, the module includes three main components including an event monitor (including a topology monitor 305A and IO performance monitor 305B), anomaly detector 310, and log collector 315.

The event monitor monitors two kinds or types of events: topology unstable and IO degradation. Events indicating an unstable topology include information indicating that a device is suddenly offline, device scanning failure and device being frequently online/offline. These are very common in the field and the detailed trace information from the DAE event buffer can be checked to help diagnose the problem. In a specific embodiment, the event monitor monitors the devices' uevent (add/remove/change uevent) messages and notifies or transmits such messages to the anomaly detector. A uevent may be transmitted by the host OS or, more particularly, the host bus adaptor.

In a specific embodiment, the topology event monitor listens for uevents 330 associated with changes in the topology. A uevent is a type of message generated by the operating system kernel when a device is added or removed (e.g., device online/offline event). For example, uevents may be generated when, for example, a status of a DAE has changed from online to offline or vice-versa, a DAE has been added or connected to the host server, a DAE has been removed or disconnected from the host server, a disk or drive in a DAE has been removed, a disk or drive has been added in a DAE, other topology changes, or combinations of these.

The IO performance monitor is responsible for monitoring performance associated with the DAEs. Performance metrics may include IO latency 335, IO throughput 340, command timeout 345, and command retry 350. IO latency is a measurement of the amount of time to complete IO requests and may be expressed in milliseconds (ms). IO throughput is a measurement of the data transfer speed and may be expressed as megabytes per second (MB/s). Command timeout provides a measurement of the time required for returning result set, before flagging an execution failure. Command retry provides a measurement of a number of times an attempt is made to complete a command.

IO degradation indicates high IO latency. IO degradation is a common problem and can be related to the topology being unstable (or firmware (FW) internal resets, for example). The IO performance monitor can check performance metrics including IO latency, throughput and error statistics such as command timeout and retry. This allows for timely identifying the IO degradation issue then notifying the anomaly detector.

The anomaly detector receives notification from the topology and IO monitors and checks or determines whether any anomaly is occurring or present. The anomaly detector includes logic to evaluate potential issues associated with an unstable topology 355, a device suddenly going offline 360, device scan failure 365, and slow IO 370.

An unstable topology may be detected if there are multiple and frequent occurrences of devices being online/offline in a short time window. A determination may be made that the topology is unstable due to, for example, a connection issue or due to other firmware or hardware reasons such as constant or repeated firmware internal resets. Devices being suddenly removed, device scanning failures, and other abnormalities may be identified from unexpected offline/online events. A slow IO may be detected when IO latency is found to be much higher than expected or when a number of command retries, timeouts, or both occur frequently within a short time window.

The log collector includes a log dump worker 375, log classifier 380, and log maintainer 385. The log dump worker is responsible for dumping a log of the problematic disk enclosure or, more particularly, problematic SAS expander in the problematic DAE. Dumping logs may include automatically generating and transmitting commands to the DAEs in order to request their logs. The logs are received from the DAEs and stored in host server storage that is separate from the DAEs. In a specific embodiment, the log dump worker not only dumps logs from the problematic disk enclosure, but also dumps one or more other disk enclosures' logs (correlated to the problematic DAE in the SAS domain).

Table A below shows a flow for log collection.

TABLE A

| Step | Description |
|------|-------------|
| 1 | Obtain logs from the DAEs attached in the same SAS chain (those share the same SAS port with the problematic DAE). |

TABLE A-continued

| Step | Description |
|---|---|
| 2 | Obtain logs from the missing expander's peer expander: When one SAS expander is suddenly offline and there is difficultly from the host side in obtaining the logs, the log collector can investigate the peer expander that is located in the same enclosure as the missing expander. (For example, retrieve peer expander's information with tunneling commands supported by GHE specification.) In a specific embodiment, an attempt is made to dump both controllers' (SAS expanders') logs in one DAE at the same time. |

Table B below shows a flow for classifying and maintaining log files in local storage of the host server.

TABLE B

| Step | Description |
|---|---|
| 1 | Upon dumping each of the DAE logs, the logs are tagged with an anomaly class. For example, the class can include slow IO, device sudden removal or device scanning failure. |
| 2 | Each class of DAE log files is limited to a specific threshold number. For example, in a specific embodiment, a threshold number of at most 3 log files are maintained for each kind or type of anomaly. Once the threshold number of logs is reached, new logs can either overwrite the old logs or the new logs may be discarded (e.g., not stored at the host server). Whether old logs are overwritten or new logs are given up does not have a significant impact on further analysis of the real problem. In a production environment, there can often be multiple instances of a certain type or kind of anomaly where the root cause is the same. So, such a log maintenance logic can be sufficient in most cases. |

Figure 4:
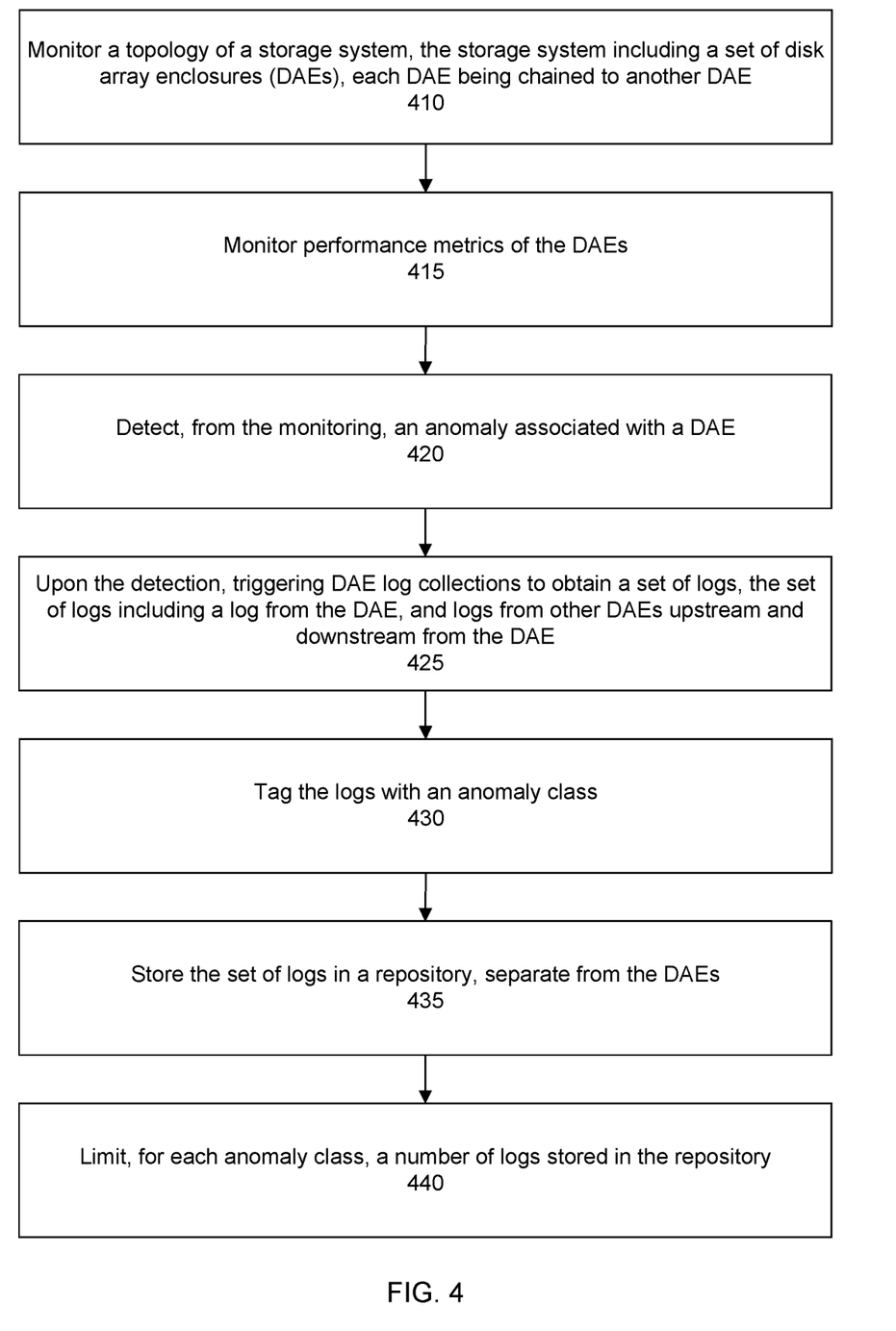
FIG. 4 shows an overall flow for anomaly aware log retrieval in accordance with one or more embodiments.

FIG. 4 shows an overall flow for conducting anomaly aware retrieval of logs from a set of DAEs. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 410, a topology of a storage system is monitored. The storage system includes a set of disk array enclosures where each disk array enclosure is chained to another disk array enclosure by first and second chains. In a specific embodiment, each disk array enclosure includes a SAS expander and a peer SAS expander. The SAS expander in a disk array enclosure forms part of the first chain. The peer SAS expander in the disk array forms part of the second chain.

In a step 415, performance metrics of the disk array enclosures are monitored. The performance monitoring may be conducted at each of the HBA ports. In a step 420, based on the topology and performance monitoring, an anomaly is detected in a disk array enclosure. In particular, the anomaly may be associated with one of a SAS expander or peer SAS expander in the disk array enclosure.

In a step 425, upon the detection, DAE log collection is triggered to obtain a set of logs. The set of logs include a log from the problematic disk array enclosure and logs from other disk array enclosures upstream and downstream from the problematic disk array enclosure.

Consider, as an example, the sample SAS domain shown in FIG. 2. If, for example, an anomaly associated with second SAS expander 215B in second DAE 210B is detected, an attempt is made to collect logs from the second DAE and logs from other DAEs upstream and downstream from the second DAE. That is, logs are collected from first DAE 210A which is upstream from the second DAE, and from third and fourth DAEs 210C and 210D which are downstream from the second DAE.

In particular, logs are retrieved from respective SAS expanders in the DAEs that are in the same chain as second SAS expander 215B. In this example, SAS expander 215A (in DAE 210A), SAS expander 215C (in DAE 210C), and SAS expander 215D (in DAE 210D) are in the same chain as SAS expander 215B in DAE 210B. Thus, commands are generated and issued to also collect logs from SAS expanders 215A, 215C, and 215D. Peer SAS expanders 220A, 220C, and 220D (in DAEs 210A, 210C, and 210D, respectively) are in a different chain. Thus, no attempt is made to collect logs from SAS expanders 220A, 220C, and 220D.

The log of a peer SAS expander in the problematic DAE, however, can include useful information to help pinpoint problems. SAS expanders in a DAE may be linked through a heartbeat or other connection scheme in which each SAS expander in the DAE is aware of the health of the other SAS expander in the DAE. The SAS expanders in the DAE may include a copy of each other's log or may record at least some events related to the other SAS expander in the DAE. In some cases, the log of the SAS expander in a problematic DAE may be unavailable (e.g., SAS expander is offline or has suffered another malfunction). Thus, in a specific embodiment, an attempt is made to also collect the logs from the peer SAS expander in the problematic DAE. That is, commands may be generated to collect the logs from second peer SAS expander 220B in second DAE 210B.

Figure 5:
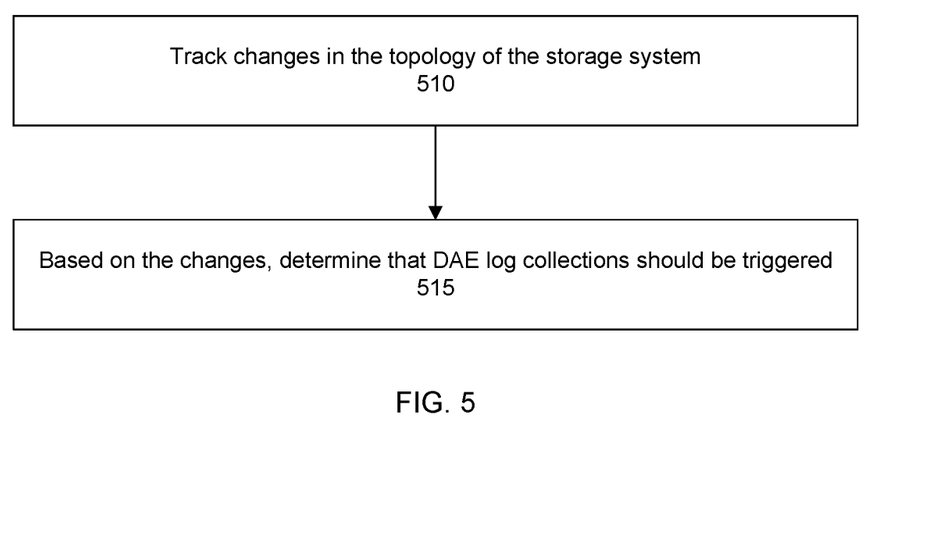
FIG. 5 shows a flow for monitoring and detecting an anomaly associated with a topology of a storage system in accordance with one or more embodiments.

FIG. 5 shows a flow for detecting anomalies based on monitoring the topology of the storage system. In brief, in a step 510, changes in the topology of the storage system are tracked. In a step 515, based on the changes, a determination is made that DAE log collections should be triggered. Consider, for example, sudden device removals. In an embodiment, the topology monitor listens and checks for a "disks/expanders remove" uevent (kernel will report a remove uevent when a device is determined to be missing). In the field, such a removal does not occur very often. Occasionally, a support team may manually hotp remove drives. It is rare, however, for the support team to repeatedly hot add/remove devices.

In a specific embodiment, to determine whether the topology has become unstable, an algorithm listens and checks for "disk remove/add" uevents. For the same disk (as identified by checking its serial number), if both remove and add uevents happen multiple times in a particular time window, it can be considered an anomaly. In the field, there can be a recommendation or suggestion that should a hot removal of a disk be performed that there be a hot add of the disk at least 1 or 2 minutes after the hot removal. In a specific embodiment, an anomaly is detected when there have been two or more than two disk remove/add uevents within the last 10 minutes.

In a specific embodiment, monitoring the topology includes tracking a number of times a disk, as identified by its serial number, is added and removed. The monitoring includes detecting an anomaly when the number of times the same disk is added and removed exceeds a threshold number within a threshold time period.

In a specific embodiment, monitoring the topology includes tracking a number of changes in the topology over a predetermined or rolling period of time, and when the number of changes over the time period exceeds a threshold, determining that the DAE log collections should be triggered. For example, a discovery that there have been 15 "disks/expanders remove" uevents recorded within the last 10 minutes may lead to a determination that there is an anomaly since it is unlikely that a support team will undertake such actions with such frequency. In another specific embodiment, monitoring the topology includes tracking a number of uevents of a particular type (e.g., sudden device removal), and determining that there is an anomaly when the number of uevents of the particular type exceeds a threshold number within a threshold rolling time period. The threshold values can be configured to any desired value. Anomalies with the storage system can be detected and addressed before they turn into major issues.

Figure 6:
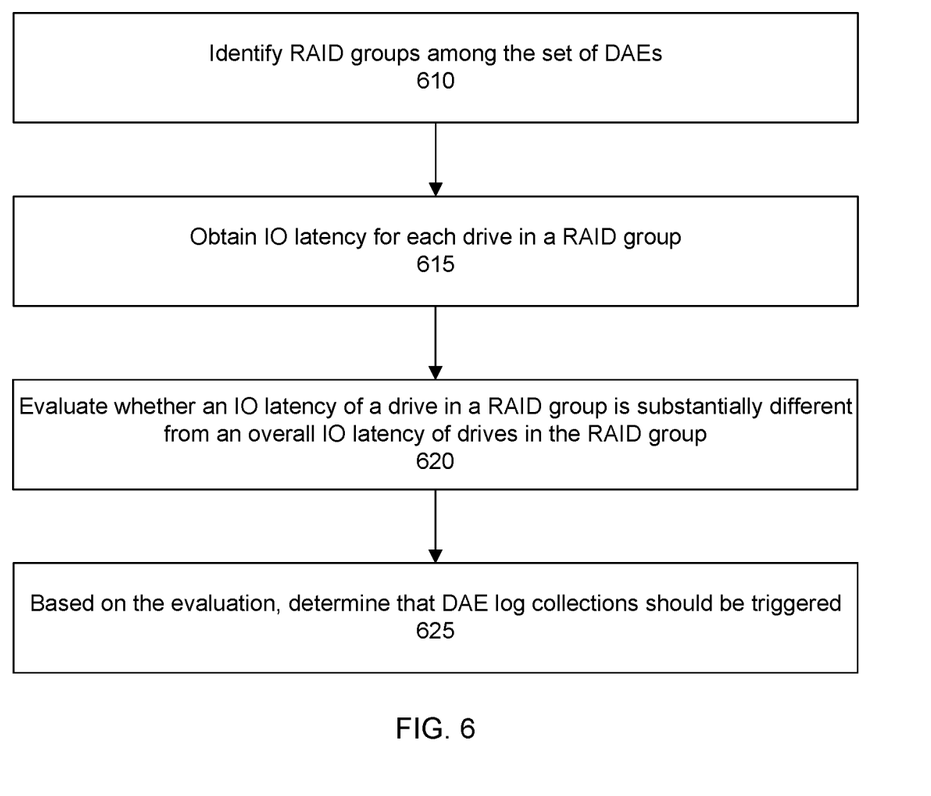
FIG. 6 shows a flow for monitoring and detecting an anomaly associated with a performance of the storage system in accordance with one or more embodiments.

FIG. 6 shows a flow for detecting anomalies based on monitoring the performance of the storage system. In brief, in a step 610, RAID groups are identified from among the set of DAEs. In a step 615, IO latency is obtained for each drive in a RAID group. In a step 620, an evaluation is performed as to whether an IO latency of a drive in the RAID group is substantially different from an overall IO latency of drives in the RAID group. In a step 625, based on the evaluation, a determination may be made that DAE log collections should be triggered.

In a specific embodiment, a "z-score" algorithm is used to detect a slow IO condition. The algorithm computes IO latency on each of the drives and compares the IO latency to that of the RAID group. In this specific embodiment, full-stripe write is supported and assumptions are made that the IO pattern and IO amount for the drives are the same in a particular RAID group. In this specific embodiment, drives are considered healthy if their IO latencies are similar to each other. In a specific embodiment, an anomaly associated with slow IO is detected if a particular drive's latency differs from a mean value beyond 10 percent and is associated with a z-score beyond 3 percent for 7 consecutive days.

In a specific embodiment, the mean is a population mean. A population mean is an average of a group characteristic, e.g., IO latency. The population mean for IO latency may be obtained by summing the IO latency metrics for each drive in the RAID group and then dividing the sum by a number of drives in the RAID group. A z-score is a measure or indication of how many standard deviations below or above the population mean a raw score is.

In a specific embodiment, a method for monitoring the performance metrics of the DAEs includes identifying a RAID group within the set of DAEs, obtaining input/output (IO) latency for each drive in the RAID group, calculating a population mean of the IO latency, generating a z-score for each drive in the RAID group based on the population mean, and determining that DAE log collections should be triggered when each of first and second conditions are satisfied. The first condition is satisfied when a particular drive in the RAID group has an IO latency that exceeds a threshold percentage of the population mean for a threshold number of consecutive days. The second condition is satisfied when the particular drive in the RAID group has a z-score that exceeds a threshold z-score for the threshold number of consecutive days.

Referring back now to FIG. 4, in a step 430, the log files are tagged with an anomaly class. Tagging can include any competent technique or combination of techniques that allows for distinguishing log files according to the anomaly that resulted in their collection. In a specific embodiment, the log classifier includes a taxonomy or tree of anomaly classes by which logs are classified. Top level classes may include topology and IO performance. Within the topology class there can be sub-classes including topology unstable, device sudden offline, and device scan failure. Within the IO performance class there can be sub-classes including IO latency, IO throughput, command timeout, and command retry.

The anomaly classes may correspond to a folder structure within which the logs, or more particularly, the log files are placed. For example, there can be top level folders labeled topology and IO performance. Within the topology folder, there can be subfolders corresponding to topology related problems. Within the IO performance folder, there can be subfolders corresponding to IO related problems. Thus, an administrator can access the IO performance folder to review logs related to IO. The administrator can access the topology folder to review logs related to topology.

Instead or additionally, names of the log files may be tagged or renamed with an anomaly class, an index or catalog may be maintained that lists the log files, their locations, and anomaly class. A log collection report may be generated each time DAE log collection is triggered. The log collection report may include information identifying the type of anomaly that resulted in DAE log collection being triggered or reason why DAE log collection was triggered, a timestamp indicating a time and date that the anomaly was detected, and a listing or inventory of the logs that were retrieved.

In a step 435, the logs are stored in a repository (e.g., local storage of the host server), separate from the DAEs. The log collection report may be stored as a separate file with the log files in the repository. The administrator, at a later time, can access the log collection report and review the log files that were generated contemporaneously with the detection of the anomaly.

In a step 440, the log maintainer limits a number of logs stored in the repository based on anomaly class. In a specific embodiment, the number of logs maintained for each anomaly class is the same. In another specific embodiment, a number of logs maintained for an anomaly class is different from a number of logs maintained for another anomaly class.

Limiting the number of logs maintained per anomaly class helps to conserve storage space while also ensuring that logs associated with a particular anomaly class are preserved when new log collection is performed.

In a specific embodiment, a method includes monitoring a storage topology including a set of disk array enclosures (DAEs) connected to a host server; detecting a first anomaly associated with the set of DAEs; upon detecting the first anomaly, triggering collection of first logs from the DAEs for storage in a repository, separate from the DAEs; tagging the first logs with a first anomaly class to identify a type of the first anomaly; determining that a number of existing logs tagged with the first anomaly class and already stored in the repository has reached a threshold number; causing one of not storing the first logs or overwriting at least some of the existing logs tagged with the first anomaly class in the repository; detecting a second anomaly associated with the set of DAEs; upon detecting the second anomaly, triggering collection of second logs from the DAEs for storage in the repository; tagging the second logs with a second anomaly class, different from the first anomaly class, to identify a type of the second anomaly; determining that the number of existing logs tagged with the second anomaly class and already stored in the repository is below the threshold number; and storing the second logs in the repository.

In another specific embodiment, a counter is maintained that tracks, by anomaly class, the number of logs currently existing or stored in the log repository at the server. In this specific embodiment, when an anomaly is detected a determination is made as to what anomaly class the anomaly is associated with. If the log counter associated with the anomaly class indicates that the number of existing logs already stored has reached a threshold number, log collection is not triggered. If the log counter is below the threshold number, log collection is triggered.

More particularly, in this specific embodiment, a method includes monitoring a storage topology including a set of disk array enclosures (DAEs) connected to a host server; maintaining a set of counters corresponding to a set of anomaly classes; detecting a first anomaly associated with the set of DAEs; determining that the first anomaly is associated with a first anomaly class; determining that a first counter representing a number of logs stored in a repository and associated with the first anomaly class has reached a threshold number; not triggering log collection for the first anomaly; detecting a second anomaly associated with the set of DAEs; determining that the second anomaly is associated with a second anomaly class, different from the first anomaly class; determining that a second counter representing a number of logs stored in the repository and associated with the second anomaly class is below the threshold number; and triggering log collection for the second anomaly.

In a specific embodiment, there is a method comprising: monitoring a topology of a storage system, the storage system comprising a plurality of disk array enclosures (DAEs) coupled to a host server, each DAE being chained to another DAE by first and second chains, and comprising a serial attached SCSI (SAS) expander and a peer SAS expander, the SAS expander in a DAE forming part of the first chain and the peer SAS expander in the DAE forming part of the second chain; monitoring performance metrics of the DAEs; detecting, from the monitoring of the topology and the performance metrics, an anomaly associated with one of a SAS expander or a peer SAS expander in a particular DAE, the one of the SAS expander or the peer SAS expander being a problematic SAS expander, the problematic SAS expander in the particular DAE being in one of the first or second chains; and upon the detecting, triggering DAE log collections to obtain a plurality of logs, the plurality of logs comprising a log stored at the problematic SAS expander in the particular DAE, and logs stored at other SAS expanders in other DAEs upstream and downstream from the particular DAE and being in the one of the first or second chains.

The method may further include tagging the plurality of logs with an anomaly class; and storing the collected logs in a repository accessible by the host server and separate from the DAEs. The method may further include tagging the plurality of logs with an anomaly class; and limiting, for each anomaly class, a number of logs stored. The DAEs may be provided by a third party.

In an embodiment, the monitoring the topology of the storage system further comprises: tracking a number of changes in the topology of the storage system over a predetermined period of time; and when the number of changes over the predetermined period of time exceeds a threshold, determining that the DAE log collections should be triggered. In an embodiment, the monitoring the performance metrics of the DAEs further comprises: identifying a redundant array of inexpensive disks (RAID) group within the plurality of DAEs; obtaining input/output (IO) latency for each drive in the RAID group; calculating a population mean of the IO latency; generating a z-score for each drive in the RAID group based on the population mean; and determining that DAE log collections should be triggered when each of first and second conditions are satisfied, wherein the first condition is satisfied when a particular drive in the RAID group has an IO latency that exceeds a threshold percentage of the population mean for a threshold number of consecutive days, and wherein the second condition is satisfied when the particular drive in the RAID group has a z-score that exceeds a threshold z-score for the threshold number of consecutive days.

In another specific embodiment, there is a system comprising: a processor; and memory configured to store one or more sequences of instructions which, when executed by the processor, cause the processor to carry out the steps of: monitoring a topology of a storage system, the storage system comprising a plurality of disk array enclosures (DAEs) coupled to a host server, each DAE being chained to another DAE by first and second chains, and comprising a serial attached SCSI (SAS) expander and a peer SAS expander, the SAS expander in a DAE forming part of the first chain and the peer SAS expander in the DAE forming part of the second chain; monitoring performance metrics of the DAEs; detecting, from the monitoring of the topology and the performance metrics, an anomaly associated with one of a SAS expander or a peer SAS expander in a particular DAE, the one of the SAS expander or the peer SAS expander being a problematic SAS expander, the problematic SAS expander in the particular DAE being in one of the first or second chains; and upon the detecting, triggering DAE log collections to obtain a plurality of logs, the plurality of logs comprising a log stored at the problematic SAS expander in the particular DAE, and logs stored at other SAS expanders in other DAEs upstream and downstream from the particular DAE and being in the one of the first or second chains.

In another specific embodiment, there is a computer program product, comprising a non-transitory computer-readable medium having a computer-readable program code embodied therein, the computer-readable program code adapted to be executed by one or more processors to implement a method comprising: monitoring a topology of a storage system, the storage system comprising a plurality of disk array enclosures (DAEs) coupled to a host server, coupled to the host server, each DAE being chained to another DAE by first and second chains, and comprising a serial attached SCSI (SAS) expander and a peer SAS expander, the SAS expander in a DAE forming part of the first chain and the peer SAS expander in the DAE forming part of the second chain; monitoring performance metrics of the DAEs; detecting, from the monitoring of the topology and the performance metrics, an anomaly associated with one of a SAS expander or a peer SAS expander in a particular DAE, the one of the SAS expander or the peer SAS expander being a problematic SAS expander, the problematic SAS expander in the particular DAE being in one of the first or second chains; and upon the detecting, triggering DAE log collections to obtain a plurality of logs, the plurality of logs comprising a log stored at the problematic SAS expander in the particular DAE, and logs stored at other SAS expanders in other DAEs upstream and downstream from the particular DAE and being in the one of the first or second chains.

Figure 7:
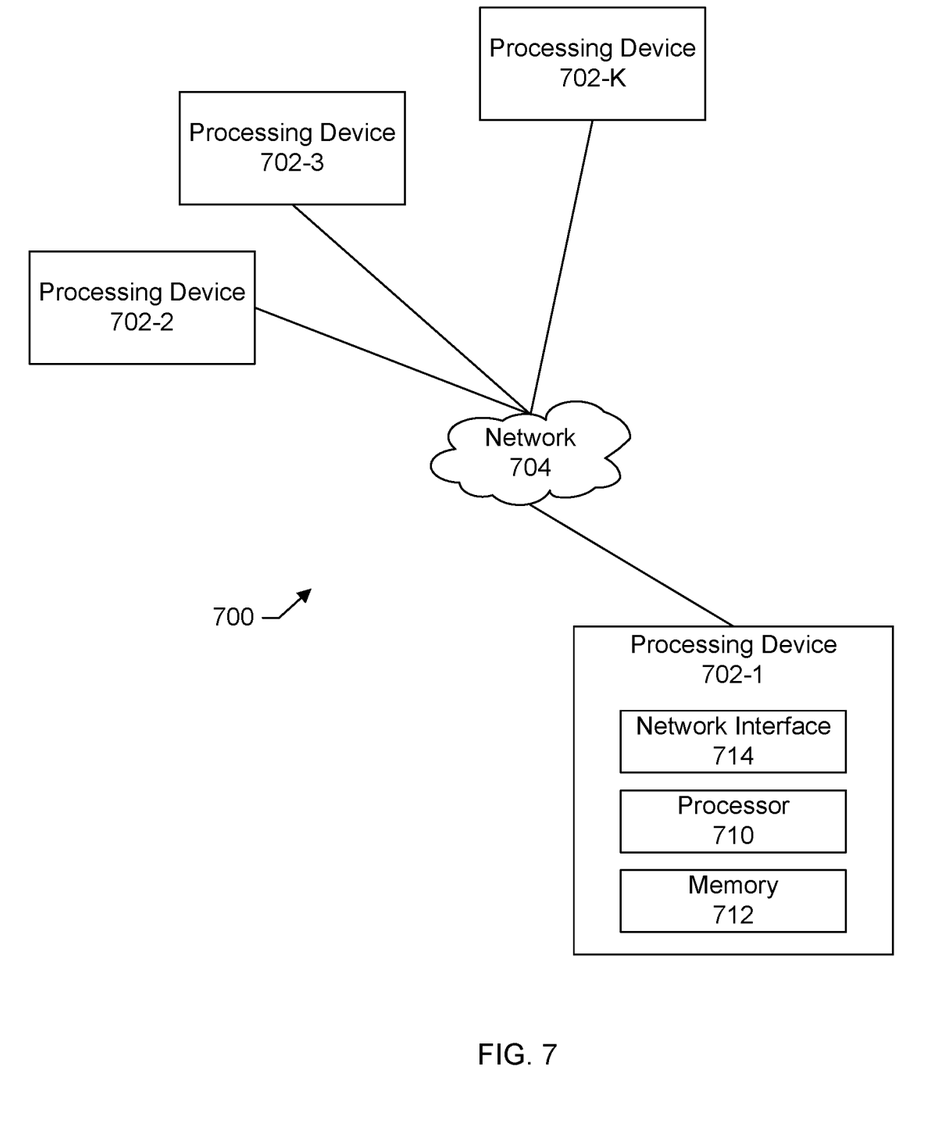
FIG. 7 shows a block diagram of a processing platform that may be utilized to implement at least a portion of an information processing system, according to one or more embodiments.

FIG. 7 shows an example of a processing platform 700. The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 700 are illustratively implemented in the form of software running on one or more processing devices.

Figure 8:
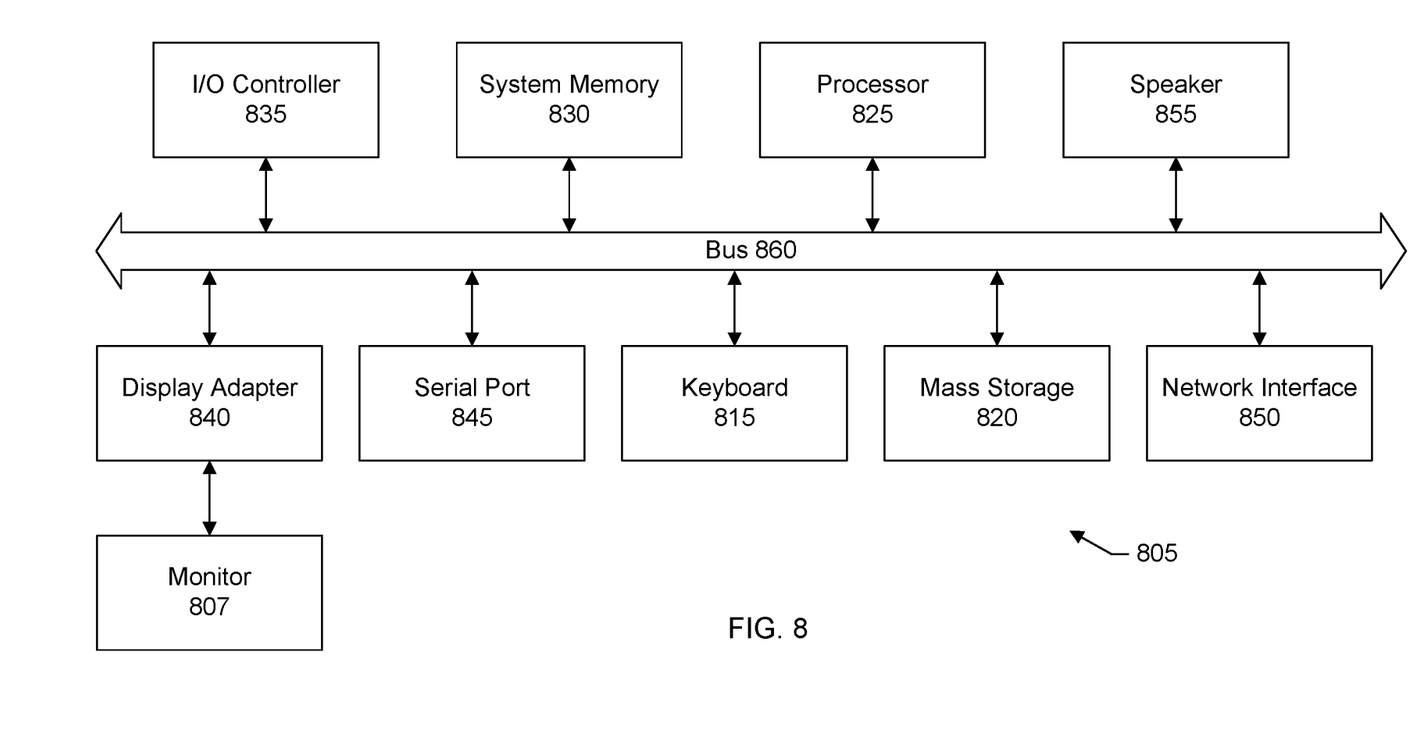
FIG. 8 shows a block diagram of a computer system suitable for use with the information processing system, according to one or more embodiments.

FIG. 8 shows a system block diagram of a computer system 805 used to execute the software of the present system described herein. The computer system includes a monitor 807, keyboard 815, and mass storage devices 820. Computer system 805 further includes subsystems such as central processor 825, system memory 830, input/output (I/O) controller 835, display adapter 840, serial or universal serial bus (USB) port 845, network interface 850, and speaker 855. The system may also be used with computer systems with additional or fewer subsystems. For example, a computer system could include more than one processor 825 (i.e., a multiprocessor system) or a system may include a cache memory.

Arrows such as 860 represent the system bus architecture of computer system 805. However, these arrows are illustrative of any interconnection scheme serving to link the subsystems. For example, speaker 855 could be connected to the other subsystems through a port or have an internal direct connection to central processor 825. The processor may include multiple processors or a multicore processor, which may permit parallel processing of information. Computer system 805 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows® family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:
   detecting an anomaly with a disk array enclosure (DAE) of a plurality of DAEs coupled to a host server, each DAE being chained to another DAE by first and second chains, and comprising a serial attached SCSI (SAS) expander and a peer SAS expander, the SAS expander in a DAE forming part of the first chain and the peer SAS expander in the DAE forming part of the second chain;
   upon the detecting, triggering DAE log collection to obtain logs for storage in a repository, separate from the DAEs;
   tagging the logs with an anomaly class of a plurality of anomaly classes; and
   limiting, for each anomaly class, a number of logs stored in the repository to a threshold number.

2. The method of claim 1 further comprising:
   tagging a first log with a first anomaly class;
   tagging a second log with a second anomaly class;
   determining that the threshold number of existing logs stored in the repository and tagged with the first anomaly class has been reached;
   discarding the first log;
   determining that the threshold number of existing logs stored in the repository and tagged with the second anomaly class has not been reached; and
   storing the second log in the repository.

3. The method of claim 1 further comprising:
   tagging a first log with a first anomaly class;
   determining that the threshold number of existing logs stored in the repository and tagged with the first anomaly class has been reached; and
   overwriting an existing log stored in the repository and tagged with the first anomaly class with the first log.

4. The method of claim 1 wherein the anomaly is associated with a particular SAS expander in a particular DAE, the particular SAS expander being a problematic SAS expander and the method further comprises:
   obtaining a log generated by a peer SAS expander of the problematic SAS expander in the particular DAE.

5. The method of claim 1 wherein the triggering DAE log collection comprises:
   obtaining logs from DAEs upstream and downstream of a particular DAE having the anomaly.

6. The method of claim 1 further comprising:
   monitoring a topology and performance of the plurality of DAEs to detect the anomaly.

7. A system comprising: a processor; and memory configured to store one or more sequences of instructions which, when executed by the processor, cause the processor to carry out the steps of:
   detecting an anomaly with a disk array enclosure (DAE) of a plurality of DAEs coupled to a host server, each DAE being chained to another DAE by first and second chains, and comprising a serial attached SCSI (SAS) expander and a peer SAS expander, the SAS expander in a DAE forming part of the first chain and the peer SAS expander in the DAE forming part of the second chain;
   upon the detecting, triggering DAE log collection to obtain logs for storage in a repository, separate from the DAEs;
   tagging the logs with an anomaly class of a plurality of anomaly classes; and
   limiting, for each anomaly class, a number of logs stored in the repository to a threshold number.

8. The system of claim 7 wherein the processor further carries out the steps of:
   tagging a first log with a first anomaly class;
   tagging a second log with a second anomaly class;
   determining that the threshold number of existing logs stored in the repository and tagged with the first anomaly class has been reached;
   discarding the first log;
   determining that the threshold number of existing logs stored in the repository and tagged with the second anomaly class has not been reached; and
   storing the second log in the repository.

9. The system of claim 7 wherein the processor further carries out the steps of:
   tagging a first log with a first anomaly class;
   determining that the threshold number of existing logs stored in the repository and tagged with the first anomaly class has been reached; and
   overwriting an existing log stored in the repository and tagged with the first anomaly class with the first log.

10. The system of claim 7 wherein the anomaly is associated with a particular SAS expander in a particular DAE, the particular SAS expander being a problematic SAS expander and the processor further carries out the step of:
    obtaining a log generated by a peer SAS expander of the problematic SAS expander in the particular DAE.

11. The system of claim 7 wherein the triggering DAE log collection comprises:
    obtaining logs from DAEs upstream and downstream of a particular DAE having the anomaly.

12. The system of claim 7 wherein the processor further carries out the steps of:
    monitoring a topology and performance of the plurality of DAEs to detect the anomaly.

13. A computer program product, comprising a non-transitory computer-readable medium having a computer-readable program code embodied therein, the computer-readable program code adapted to be executed by one or more processors to implement a method comprising:
    detecting an anomaly with a disk array enclosure (DAE) of a plurality of DAEs coupled to a host server, each DAE being chained to another DAE by first and second chains, and comprising a serial attached SCSI (SAS)

expander and a peer SAS expander, the SAS expander in a DAE forming part of the first chain and the peer SAS expander in the DAE forming part of the second chain;

upon the detecting, triggering DAE log collection to obtain logs for storage in a repository, separate from the DAEs;

tagging the logs with an anomaly class of a plurality of anomaly classes; and limiting, for each anomaly class, a number of logs stored in the repository to a threshold number.

14. The computer program product of claim 13 wherein the method further comprises:

tagging a first log with a first anomaly class;

tagging a second log with a second anomaly class;

determining that the threshold number of existing logs stored in the repository and tagged with the first anomaly class has been reached;

discarding the first log;

determining that the threshold number of existing logs stored in the repository and tagged with the second anomaly class has not been reached; and storing the second log in the repository.

15. The computer program product of claim 13 wherein the method further comprises:

tagging a first log with a first anomaly class;

determining that the threshold number of existing logs stored in the repository and tagged with the first anomaly class has been reached; and overwriting an existing log stored in the repository and tagged with the first anomaly class with the first log.

16. The computer program product of claim 13 wherein the anomaly is associated with a particular SAS expander in a particular DAE, the particular SAS expander being a problematic SAS expander and the method further comprises:

obtaining a log generated by a peer SAS expander of the problematic SAS expander in the particular DAE.

17. The computer program product of claim 13 wherein the triggering DAE log collection comprises:

obtaining logs from DAEs upstream and downstream of a particular DAE having the anomaly.

18. The computer program product of claim 13 wherein the method further comprises:

monitoring a topology and performance of the plurality of DAEs to detect the anomaly.

* * * * *